(12) United States Patent
Deutsch

(10) Patent No.: US 6,591,817 B2
(45) Date of Patent: Jul. 15, 2003

(54) DUAL FUEL METHOD AND SYSTEM

(75) Inventor: Robert W. Deutsch, Sugar Grove, IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/813,622

(22) Filed: Mar. 21, 2001

(65) Prior Publication Data

US 2002/0134362 A1 Sep. 26, 2002

(51) Int. Cl.⁷ ............................................. F02M 21/02
(52) U.S. Cl. ......................... 123/525; 526/276 E
(58) Field of Search ................. 123/27 GE, 525, 123/526

(56) References Cited

U.S. PATENT DOCUMENTS

| | | | |
|---|---|---|---|
| 3,799,125 A | * | 3/1974 | Hutchinson .............. 123/3 |
| 4,150,645 A | | 4/1979 | Berent |
| 4,265,208 A | | 5/1981 | Emmert et al. |
| 4,303,049 A | | 12/1981 | Ikeura et al. |
| 4,305,350 A | | 12/1981 | Brown et al. |
| 4,323,046 A | | 4/1982 | Barber |
| 4,353,345 A | * | 10/1982 | Ebihara ............... 123/575 |
| 4,391,251 A | | 7/1983 | Planteline et al. |
| 4,398,517 A | | 8/1983 | Kubota et al. |
| 4,524,033 A | * | 6/1985 | Elledge ................ 123/575 |
| 4,671,243 A | | 6/1987 | Deutsch |
| 5,450,832 A | | 9/1995 | Graf |
| 5,524,582 A | | 6/1996 | Suh et al. |
| 5,623,907 A | | 4/1997 | Cotton et al. |
| 5,720,266 A | | 2/1998 | Nogi et al. |
| 5,816,224 A | | 10/1998 | Welsh et al. |
| 6,035,837 A | * | 3/2000 | Cohen et al. .......... 123/27 GE |

FOREIGN PATENT DOCUMENTS

JP 63230933 3/1997

* cited by examiner

*Primary Examiner*—Noah P. Kamen
(74) *Attorney, Agent, or Firm*—Kenneth D. Labudda; Thomas V. Miller (57) ABSTRACT

A special dual fuel method and system is provided to enhance vehicle performance and fuel consumption as well as to accommodate a smooth transition when operating the engine on different fuels, such as gasoline or liquified petroleum gas (LPG). When the engine is operated on a different fuel, a filtered oxygen ($O_2$) signal is transmitted to an engine control unit (ECU) which can regulate operation of the gasoline shutoff valve and an LPG valve and responds to the filtered $O_2$ signal and the type of fuel, i.e. mode of operation, selected for the dual fuel engine.

27 Claims, 5 Drawing Sheets

DUAL FUEL METHOD AND SYSTEM

BACKGROUND OF THE INVENTION

This application pertains to a dual fuel method and system for use with internal combustion engines of vehicles.

As gasoline supplies have decreased and become more costly, the need for alternative fuels and fuel conservation has become greater. Accordingly, alternate sources of fuels and methods of fuel conservation have become more attractive, particularly for internal combustion engines for automotives.

Operation of an internal combustion engine on a liquid fuel and a gaseous fuel increases fuel economy and engine efficiency while at the same time maintaining low levels of undesirable exhaust emissions. Vehicles adapted to operate on either a liquid fuel or a gaseous fuel are sometimes called "dual fuel" or "multi-fuel" vehicles.

In order to maximize fuel economy and minimize engine emissions, there has been a trend to use gaseous fuels, such as compressed natural gas (CNG), liquid natural fuels (LNG), such as ethanol, and liquid or liquified petroleum gas (LPG). Gaseous fuels, such as CNG, and LPG, not only provide good fuel economy and low engine emissions, but also provide better cold starting of internal combustion engines.

Gaseous fuels comprise combustible fuels which are gaseous at standard temperature and pressure. Gaseous fuels used by dual fuel vehicles include methane comprising natural gas or compressed natural gas (CNG), hydrogen, etc. The term gaseous fuels also includes liquified petroleum gas (LPG). LPG is particularly desirable as gaseous fuel. LPG under pressure may be either in the gaseous phase, the liquid phase, or both. Examples of LPG are propane, butane, dimethyl ether (DME), etc.

Atmospheric pollution from combustion of hydrocarbon fuels, such as emitted from the exhaust of gasoline fueled automotive internal combustion engines, if not properly controlled, can cause problems. Substantial effort and research has gone into the development of vehicle engines which operate on various lighter hydrocarbon fuels as an alternative to gasoline, such as ethanol, and even those fuels having less complex hydrocarbon molecules with fewer carbon atoms per molecule, i.e., pentane, butane, propane, methane, and even ethane. Natural gas (methane) has been used because of its abundance and clean burning performance, its relatively low costs and its use as a fuel for stationary internal combustion engines. In order to provide an adequate supply in vehicles for fueling vehicle internal combustion engines, the fuel must be stored in highly compressed form, requiring heavy duty, highly pressurized fuel tanks and fuel system components capable of storing gaseous methane at ambient temperatures ranging up to 125° F. (51.6° C.) and be capable of withstanding high pressures.

Propane on the other hand, can be stored in liquid form and at much lower pressures than methane, e.g. 0 psi at −44° F. (−42.2° C.), 125 psi at about 70° F. (21.1° C.) and 260 psi at 125° F. (51.6° C.). In some geographic locations, supplies of liquid propane fuel for a variety of uses are already relatively abundant and economical.

Various dual fuel systems have been developed utilizing propane as the alternative fuel of choice with pressurized containment and delivery of propane. Typical vehicle propane fuel tank systems commercially available supply propane in gaseous form to the engine intake manifold via a carburetor fuel feed system or an electronic fuel injection (EFI) system.

Many conventional dual fuel systems are expensive and unreliable. Furthermore, conventional dual fuel systems often have two separate systems with many duplicate, redundant and/or extra sets of parts, components, or equipment, such as computers, hoses, burner assemblies, second stage regenerators, etc. Further, conventional dual fuel systems are often bulky and occupy valuable space in the hood (bonnet) of the vehicle. The extra weight of duplicate equipment of conventional dual fuel systems can increase fuel consumption.

Moreover, conventional dual fuel systems often encounter vehicle performance problems at switchover to different fuels. Switchover to different fuels can be unstable due to timing delays of two fuels. For example, when a conventional carbureted dual fuel system is switched from a gasoline mode to a liquified petroleum gas (LPG) mode, gasoline continues to be fed into the engine at the same time as LPG until the gasoline in the float bowl of the carburetor is empty. This can cause flooding and stalling of the internal combustion engine. When a conventional carbureted dual fuel system is switched from an LPG mode to a gasoline mode, the LPG is shut off, but no gasoline will be fed into the engine until the gasoline fills the float bowl of the carburetor. This can cause choking or sputtering of the internal combustion engine.

Conventional dual fuel system with electronic fuel injectors (EFI) encounter similar problems. For example, when a conventional EFI dual fuel system is switched from a gasoline mode to an LPG mode, gasoline continues to be fed to the engine at the same time as LPG until the residual gasoline in the fuel rail and hoses are depleted. This can cause an undesirable mixture of gasoline and LPG which can cause malfunction and/or engine performance problems. Moreover, when a conventional EFI dual fuel system is switched from a LPG mode to a gasoline mode, residual LPG in the fuel rail and hose will continue to flow into the engine with gasoline which can create unstable, rough and uneven vehicle performance.

It is, therefore, desirable to provide an improved dual fuel method and system, which overcomes most, if not all, of the preceding problems.

SUMMARY OF THE INVENTION

An improved dual fuel method and system is disclosed which provides a smooth transition from a first fuel to a second fuel. The first fuel can be a liquid fuel, such as gasoline or petro, and the second fuel can be a gaseous fuel, such as liquified petroleum (LPG). The dual fuel system can also be constructed to eliminate costly control elements and duplicate sets of equipment for the LPG system, such as computers, hoses, burners assemblies, second stage regenerators, etc. Advantageously, the improved dual fuel method and system is economical, easy-to-use, and convenient. Desirably, the user-friendly dual fuel method and system is reliable, safe, efficient, and effective. Significantly, the inventive dual fuel method and system provides for better fuel economy, occupies less space, and uses less fuel than conventional bulky dual fuel methods and systems.

The preferred liquid fuel is gasoline, although other types of liquid fuels can be used in some circumstances, if desired. The preferred LPG is propane, although other types of LPG can be used if desired, such as butane, dimethyl ether (DME), etc. The preferred gaseous fuel is LPG, although other types of gaseous fuels can be used in some circumstances, such as compressed natural gas (CNG), etc.

The improved dual fuel method and system is especially useful in a vehicle, such as: an automobile, a taxicab, a sport utility vehicle (SUV), a van, a station wagon, a truck, a motorcycle, a snow mobile, a jet ski, an all terrain vehicle, a ship, an airplane, a tractor, a backhoe, a bulldozer, a crane, or road grading equipment. The improved dual fuel method and system can also be used in other mobile engines as well as stationary engines, such as in power plants, generating systems, etc.

The special method for operating a dual fuel system in accordance with principles of the present invention, comprises the steps of: pumping a first fuel, such as gasoline, to a fuel feeding device; feeding the first fuel (e.g., gasoline) from the fuel feeding device to an engine; and operating the engine with the first fuel in a first fuel mode. When it is desired to change the mode of operation of the engine to operate on a second fuel, such as liquid petroleum gas (LPG), the flow of the first fuel (e.g., gasoline) to the fuel feeding device is stopped. In order to prevent flooding, stalling and malfunction of the internal combustion engine, it is best to wait until the first fuel (e.g., gasoline) is substantially empty from the fuel feeding device so as to prevent the flow of the first fuel (e.g., gasoline) from the fuel feeding device to the engine before opening the second fuel valve (e.g., LPG valve) for feeding, supply and access to the second fuel, e.g. LPG. When the second fuel valve is open, the second fuel (e.g., LPG) is passed to the engine so that the engine can operate on the second fuel in the second fuel mode.

When it is desirable to change the mode of operation of the engine from a second fuel mode to a first fuel mode, the first fuel (e.g., gasoline) is pumped to the fuel feeding device. In order to prevent choking, sputtering, unstable, rough, and uneven vehicle performance, it is best to wait until the first fuel (e.g., gasoline) substantially fills the fuel feeding device before closing the second fuel valve. When the second fuel valve is closed, the flow and feeding of the second fuel to the engine is stopped. Thereafter, the first fuel (e.g., gasoline) is fed from the fuel feeding device to the engine so that the engine can operate on the first fuel.

In one form, the fuel feeding device comprises a carburetor with a float bowl. The first fuel (e.g., gasoline) can be pumped by a fuel pump which operatively associated with the engine.

In another form, the fuel feeding device comprises one or more electronic fuel injectors (EFI) with one or more fuel rails and fuel line(s). The first fuel (e.g., gasoline) can be pumped by a fuel pump which operatively associated with a first fuel tank.

In a preferred form, exhaust gases are emitted from the engine and the oxygen content of the exhaust gases are monitored. A signal, such as an oxygen ($O_2$) signal and preferably a filtered signal, e.g., a filtered $O_2$ signal, is generated based upon a monitored oxygen content of the exhaust gases over a finite selected period of time. The filtered signal can be generated in or associated with an engine control unit (ECU), which controls operation of the valves, such as the second fuel valve (e.g., LPG valve), based upon the filtered signal. Preferably, the second fuel valve is opened when the filtered signal decreases upon changing to the second fuel mode. Also, preferably, the second fuel valve is closed when the filtered signal increases upon changing to the first fuel mode.

In order to increase the reliability and further enhance the failsafe operation of the dual fuel method and system, the filtered signal can be timed to generate a timing signal which provides a timer, sometimes referred to as a "watch dog" timer. In the second fuel mode (e.g., LPG mode), the second fuel valve can be opened upon receiving a timing signal from the watch dog timer if the filtered signal does not substantially change for a preselected (predetermined) period of time. In the first fuel mode (e.g., gasoline mode), the second fuel valve can be closed upon receiving a timing signal from the watch dog timer if the filtered signal does not substantially change for a preselected (predetermined) period of time.

A dual fuel system for a vehicle can also be constructed in accordance with principals of the present invention with a dual fuel engine, such as to drive a vehicle. The dual fuel engine can be powered by separate fuels including a first fuel comprising a liquid fuel, such as gasoline, and a second fuel comprising a gaseous fuel, such as liquified petroleum gas (LPG) or compressed natural gas (CNG). Desirably, the engine is operable and switchable from a first fuel (e.g., gasoline) mode and in a second fuel mode (e.g., gaseous fuel).

A dual fuel system can have an intake manifold which is connected to the engine to pass fuel to the engine. A carburetor can be provided with a float bowl and a valve, such as a butterfly valve, which communicates with the intake manifold to feed gasoline (the first fuel) to the engine when the engine is operating in the gasoline (first fuel) mode. The dual fuel system can also include an air filter which is positioned in proximity to the carburetor. A gasoline tank is preferably provided to store and contain gasoline. A fuel pump can be operatively associated with the engine to pump gasoline from the gasoline tank to the carburetor when the engine is operating in the gasoline mode. A gasoline valve can be provided to control the flow of gasoline to the carburetor. Desirably, a control valve (air valve) is provided which communicates with the air filter and the intake manifold, to pass filtered air from the filter to the gasoline flowing into the intake manifold at an air-fuel ratio regulated by the butterfly valve of the carburetor and/or ECU. Advantageously, a one-way valve is provided to permit the passage of filtered air from the air filter to the control valve (air valve) as well as to prevent the flow of the second fuel to the air filter.

The dual fuel system preferably also comprises a second fuel tank to store and contain a second fuel, such as LPG or CNG. A second fuel valve can be provided to control the flow of the second fuel (LPG or CNG) from the second fuel tank to the control valve. The control valve is operable to pass the second fuel to the intake manifold when the engine is operating in the second fuel mode. The control valve can comprise a dual air valve and a pulse width modulation (PWM) valve. Desirably, an engine control unit (ECU) is operatively associated with the engine, as well as with the control valve, gasoline valve, and second fuel valve, to control the performance of the engine, control valve, gasoline valve, and second fuel valve. A mode selection switch which is operatively connected to the ECU can also be provided to permit the operator or driver to select when the engine is operating in the gasoline mode or in the second fuel mode.

In one form, the second fuel comprises liquified petroleum gas (LPG) and the second fuel valve comprises an LPG valve. The system can include a regulator and a vaporizer connected to the LPG valve to regulate and vaporize the LPG when the engine is operating in the second fuel mode.

In another form, the second fuel comprises compressed natural gas (CNG) and the second fuel tank comprises a CNG tank.

In the preferred form, an exhaust pipe is provided which communicates with the engine to discharge exhaust gases.

Desirably, a catalytic converter is provided to minimize emissions of pollutants into the atmosphere from the exhaust gases. Advantageously, an oxygen ($O_2$) sensor is provided which communicates with the engine control unit (ECU) to sense and monitor the oxygen content in the exhaust gases.

A more detailed explanation of the invention is provided in the following detailed description and appended claims taken in conjunction with the accompanying drawings.

DETAILED DESCRIPTION OF THE PREFERRED EMBODIMENTS

Figure 1:
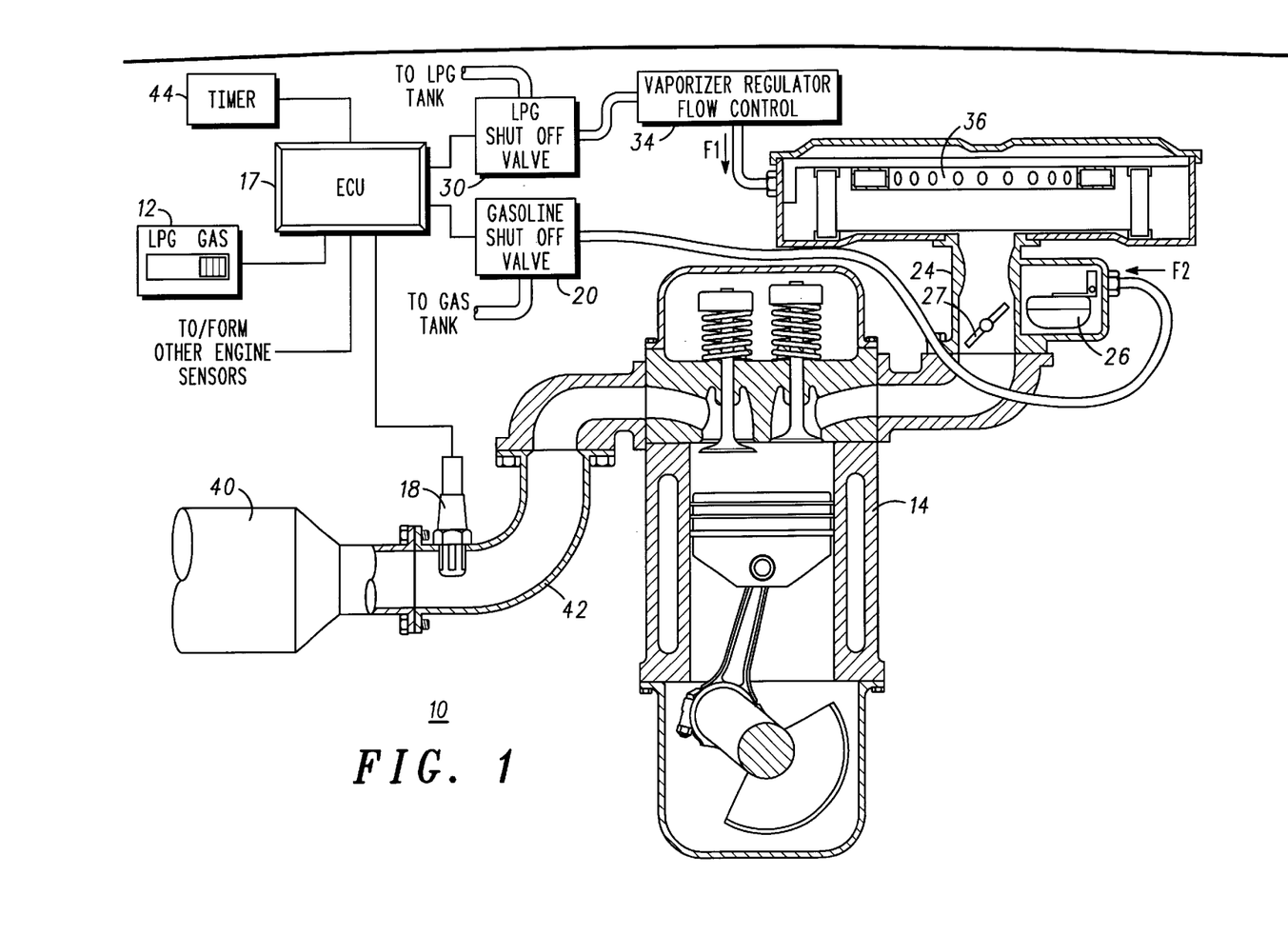
FIG. 1 is a diagram of a carbureted dual fuel system and method in accordance with principles of the present invention.

The carbureted dual fuel method and system 10 of FIG. 1 has a mode selection switch 12 to select the mode of operation of an internal combustion engine 14 of a vehicle from a gasoline (first fuel) mode to a liquified petroleum gas (LPG) (second fuel) mode. An engine control unit (ECU) 17 is connected to the mode selection switch and the engine. An oxygen ($O_2$) sensor 18 is connected to the ECU to detect, sense and monitor the oxygen content in the exhaust gases from the engine. A gasoline shutoff valve 20 is connected to the ECU. The gasoline shutoff valve controls the flow of gasoline from a gasoline tank 22 to a carburetor 24. The carburetor has a float bowl 26 and a valve 27, such as a butterfly valve, to control the air-fuel ratio of the air-fuel mixture in the carburetor. An air filter (not shown) can be seated on or positioned in proximity to the carburetor. The carburetor via the float bowl feeds gasoline to the engine.

The dual fuel method and system of FIG. 1 also includes an LPG shutoff valve 30 which is connected to the engine control unit (ECU). The LPG valve controls the flow of fuel from an LPG tank to a vaporizer and regulator flow control 34. The combined vaporizer and regulator flow control vaporizes the liquified petroleum gas (LPG) and regulates the flow of the vaporized LPG to a burner 36 which is operatively associated with the engine.

A fuel pump pumps gasoline from the gasoline tank to the carburetor. Preferably, a catalytic converter 40 is provided to limit the emission of pollutants in the exhaust gases as well as to comply with environmental regulations. The oxygen content of the exhaust gases entering the catalytic converter can be detected and monitored with the $O_2$ sensor.

A preferred method to operate the carbureted dual fuel system in the vehicle includes the steps of pumping gasoline to the carburetor with a fuel pump. The gasoline is then fed from the carburetor to the engine so that the engine can operate on gasoline in gasoline mode. The exhaust gases can be emitted and discharged from the engine through an exhaust pipe 42 (FIG. 1). Desirably, the emission of pollutants in the exhaust gases are limited and regulated by the catalytic converter.

In order to better control the operation of the catalytic converter, the oxygen content of the exhaust gases are detected and monitored by the oxygen ($O_2$) sensor. An oxygen ($O_2$) signal can be generated based upon the oxygen content of the exhaust gases which is detected by the $O_2$ sensor. Desirably, a mean or average value of the $O_2$ signal is determined for a finite preselected period of time to provide a filtered $O_2$ signal. The filtered $O_2$ signal is then sent and transmitted to the engine control unit (ECU). The engine control unit can contain a central processing unit (CPU), comprising a computer, computer chip, integrated chip, microprocessor, or circuit board.

In the carbureted dual fuel system, the operation of the LPG valve is preferably controlled by the engine control unit (ECU) of the vehicle. In order to change the mode of operation of the vehicle from a gasoline mode to a LPG mode, the mode selection switch is toggled or switched to an LPG mode and the gasoline valve is closed to stop the flow of gasoline to the carburetor. In order to prevent flooding, stalling and mixing of fuels in the engine, it is desirable to wait until the gasoline substantially empties from the float bowl of the carburetor until the LPG valve is opened to access and obtain the LPG. After the LPG valve is opened, the LPG is vaporized and fed to the engine so that the engine can operate on vaporized LPG in the LPG mode. Preferably, in the LPG mode, the LPG valve is opened when the filter $O_2$ signal decreases to a threshold value.

The engine control unit (ECU) can include or be connected to a timer 44 (FIG. 1), sometimes referred to as a watchdog timer, which can comprise a timing circuit. The timer in cooperation with the ECU generates a timing signal if the filtered $O_2$ signal does not decrease to a threshold value for a predetermined (preselected) period of time. Desirably, in the LPG mode, the LPG valve is opened in response to the timing signal if the LPG valve has not been earlier opened when the filtered $O_2$ signal decreases to a threshold value. The timer provides an auxiliary control and further failsafe backup to assure smooth performance of the dual fuel engine and system.

The mode selection switch can be switched or toggled to the gasoline mode when it is desirable to change the operation of the engine from the LPG mode to the gasoline mode. In the gasoline mode, the gasoline valve is opened and gasoline is further pumped to the carburetor by the fuel pump. In order to prevent choking and lapse of fuel to the engine, it is preferred to wait until the gasoline substantially fills the float bowl of the carburetor before closing the LPG valve and stopping the flow, vaporization and feeding of LPG to the engine. Once the LPG valve is closed, gasoline is fed from the carburetor to the engine so that the engine can operate on gasoline in the gasoline mode. Preferably, in the gasoline mode, the LPG valve is closed when the filtered $O_2$ signal increases to a threshold value. The timer, which can comprise a timing circuit, can also cooperate with the ECU to generate a timing signal if the filtered $O_2$ signal does not increase to a threshold value for a finite predetermined (preselected) period of time. Desirably, in the gasoline mode, the LPG valve is closed in response to the timing signal if the LPG valve has not been previously closed when the filtered $O_2$ signal increases to a threshold value. As discussed previously, the timer provides a safety backup and auxiliary control to assure smooth operation and performance of the engine and vehicle.

Figure 2:
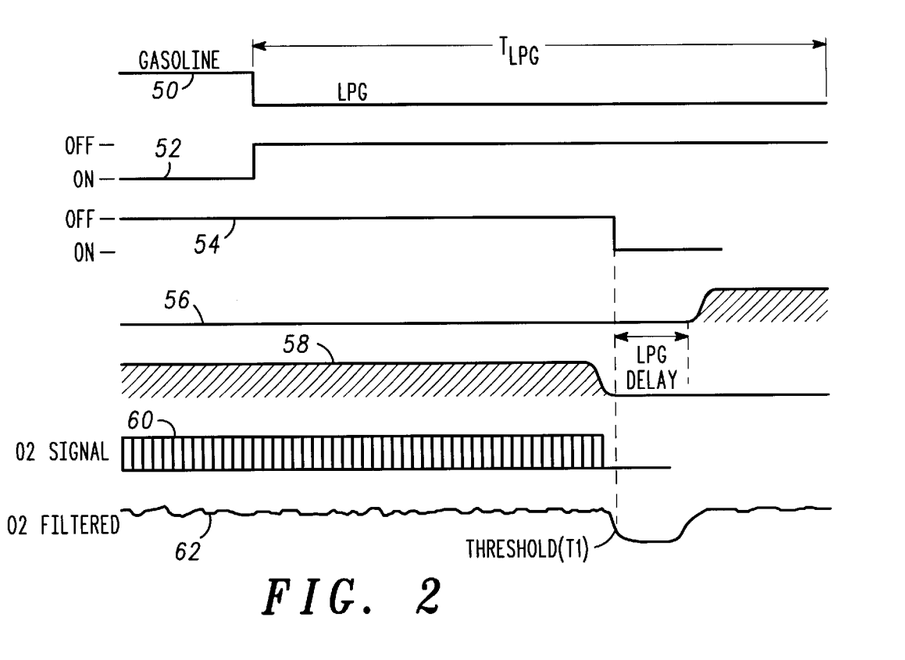
FIG. 2 is a chart of the transition (switchover) from gasoline to liquified petroleum gas (LPG) showing the flow of gasoline and LPG as well as the $O_2$ signal and filtered $O_2$ signal.

FIG. 2 is a chart of the transition (switchover) of gasoline to liquified petroleum gas (LPG) as a function of time ($T_{LPG}$). The top chart (diagram) 50 show the operation of the mode switch from gasoline to LPG as a function of time. The next lower chart (diagram) 52 shows the operation of the gasoline shutoff valve as a function of time during the transition (switchover) from the gasoline mode to the LPG mode. The next lower chart (diagram) 54 shows the operation of LPG shutoff valve as a function of time during the transition (switchover) from the gasoline mode to the LPG mode. The next lowest chart (diagram) 56 illustrates the flow of LPG as a function of time during the transition (switchover) from the gasoline mode to the LPG mode. The next lower chart (diagram) 58 illustrates the flow of gasoline through the gasoline hose as a function of time during the transition (switchover) from the gasoline mode to the LPG mode. The next lower chart (diagram) 60 illustrates the unfiltered $O_2$ signal as a function of time during the transition (switchover) from the gasoline mode to the LPG mode. The bottom chart (diagram) 62 illustrates the filtered $O_2$ signal as a function of time during the transition (switchover) from the gasoline mode to the LPG mode.

Figure 3:
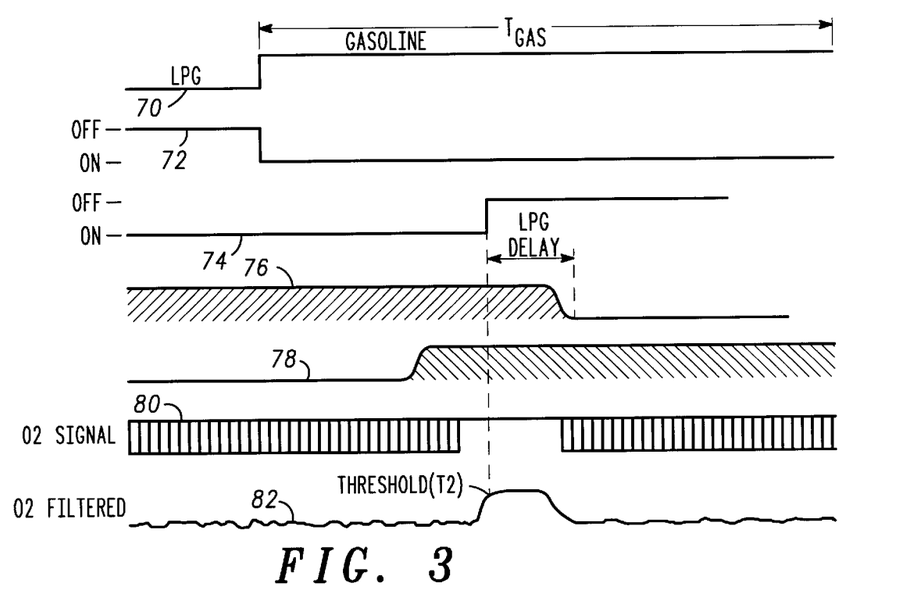
FIG. 3 is a chart of the transition (switchover) from LPG to gasoline showing the flow of gasoline and LPG as well as the $O_2$ signal and filtered $O_2$ signal.

FIG. 3 is a chart of the transition (switchover) from LPG to gasoline as a function of time ($T_{gas}$). The upper chart (diagram) 70 illustrates the operation of the mode selection switch from LPG to gasoline as a function of time. The next lower chart (diagram) 72 illustrates operation of the gasoline shutoff valve as a function of time during the transition from the LPG mode to the gasoline mode. The next lower chart (diagram) 74 illustrates operation of the LPG shutoff valve as a function of time during the transition (switchover) from LPG to gasoline. The next lower chart (diagram) 76 illustrates the flow of LPG during the transition (switchover) from gasoline to LPG. The next lower chart (diagram) 78 illustrates the flow of gasoline in the float bowl of the carburetor during the transition (switchover) from LPG to gasoline. The next lower chart (diagram) 80 illustrates the unfiltered $O_2$ signal as a function of time during the transition (switchover) from gasoline to LPG. The bottom chart (diagram) 82 illustrates the filtered $O_2$ signal as a function of time during the transition (switchover) from gasoline to LPG.

Figure 4:
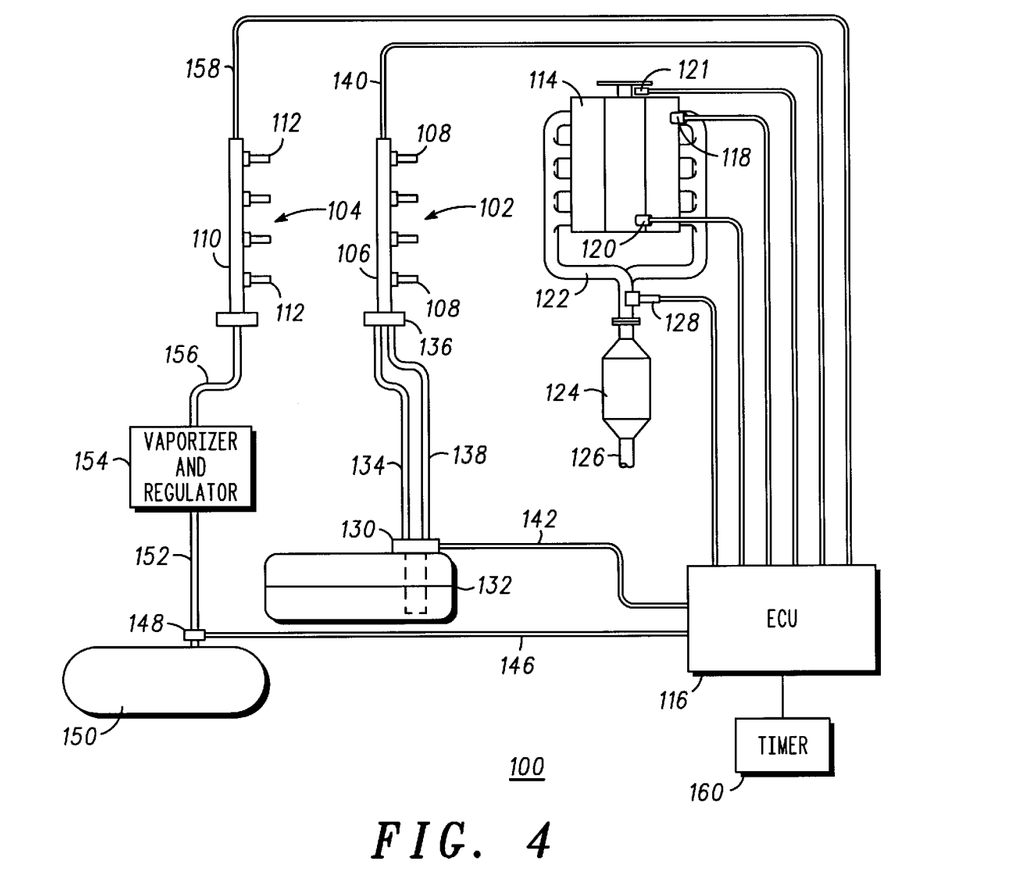
FIG. 4 is a diagram of a dual fuel system and method with electronic fuel injectors (EFI) in accordance with principles of the present invention.

FIG. 4 illustrates a dual fuel method and system 100 with electronic fuel injectors (EFI) including a gasoline electronic fuel injector (EFI) 102 and an LPG electronic fuel injector (EFI) 104. The gasoline EFI can include a gasoline fuel rail 106 with four electronic fuel injectors 108. The LPG EFI can include an LPG gaseous fuel rail 110 and four gaseous LPG electronic fuel injectors 112. The gasoline fuel injectors inject gasoline into a dual fuel internal combustion engine 114. The gaseous LPG fuel injectors inject gaseous LPG into the dual fuel internal combustion engine.

The dual fuel engine is connected to and controlled by an engine control unit (ECU) 116. The ECU can be connected to a coolant sensor 118, a manifold absolute pressure (MAP) sensor 120, and an engine speed sensor 122, which are positioned in proximity with and operatively connected to the engine. The coolant sensor senses the temperature of the engine coolant. The MAP sensor detects the pressure in the intake manifold. The engine speed sensor detects the rpm or speed of the engine. Signals from the coolant sensor, MAP sensor and engine speed sensor can be transmitted and sent to the ECU to help the ECU better control the performance of the engine. This is particularly helpful when the engine is warming up or in transient phase such as during acceleration, braking, when the air conditioner is being turned on (activated), etc.

Exhaust gases from the engine are discharged through an exhaust pipe 122 (FIG. 4), sometimes referred to as a discharge pipe or tailpipe 122, and passed through a catalytic converter 124 to minimize pollution. The purified exhaust gases can be emitted to the atmosphere from an exhaust outlet 126. An oxygen ($O_2$) sensor 128 can be positioned in the discharge pipe upstream of the catalytic converter to detect and monitor the oxygen content of the exhaust gases entering the catalytic converter. The $O_2$ sensor is connected to the ECU. The $O_2$ sensor generally provides an accurate detection of the oxygen content of the exhaust gases, except during initial warm-up and in transient phases (transition), such as described above, when signals from the MAP sensor, as well as the coolant sensor and engine speed sensor, provide a more reliable reading of engine performance.

The ECU is connected to a gasoline fuel pump 130 (FIG. 4) which can be positioned inside or adjacent a gasoline fuel tank 132. The gasoline fuel pump feeds and pumps gasoline from the gasoline tank through a gasoline input line (hose) 134 to a gasoline pressure regulator 136 of the gasoline EFI. A return line (hose) 138 can extend between the gasoline pressure regulator and the gasoline fuel pump for the return of gasoline vapors and liquid as determined by the gasoline pressure regulator. An injector control line 140 can extend between and connect the gasoline EFI to the ECU. A gasoline pump line 142 connects the gasoline fuel pump to the ECU. Although not explicitly described in the drawings, a gasoline pump control or gasoline shutoff valve can be connected to the gasoline pump line to control the operation of the gasoline fuel pump.

The ECU can be connected through an LPG shutoff line 146 to an LPG shutoff valve 148. The LPG shutoff valve controls the flow of liquified petroleum gas (LPG) from an LPG tank 150. When the LPG valve is open, LPG will flow through an LPG inlet line (hose) 152 to a vaporizer and regulator 154. The vaporizer and regulator vaporizes and regulates the flow of LPG. The vaporized LPG flows through a vaporized LPG line (hose) 156 into the LPG EFI. The LPG EFI can be connected by an injector control line 158 to the ECU.

A preferred method to operate the dual fuel system with electronic fuel injectors (EFI) in a vehicle, comprises pumping gasoline to a gasoline electronic fuel injector (EFI) with a gasoline fuel pump which is operatively associated with a gasoline tank of a vehicle. The gasoline is then injected from a gasoline rail of the gasoline EFI to the engine of the vehicle so that the dual fuel engine can operate on gasoline in a gasoline mode.

In the dual fuel system with EFI, exhaust gases from the engine are emitted through an exhaust pipe and passed through a catalytic converter. The catalytic converter limits the emission of pollutants in the exhaust gases. The oxygen content of exhaust gases are sensed and monitored by an oxygen ($O_2$) sensor. An oxygen ($O_2$) signal is generated based upon the oxygen content of the exhaust gases which is sensed by the $O_2$ sensor. A mean or average value of the $O_2$ signal is determined for a finite preselected (predetermined) period of time to produce a filtered $O_2$ signal. The filtered $O_2$ signal is sent and transmitted to an engine control unit (ECU). The engine control unit contains a central processing unit (CPU) which can comprise a computer, computer chip, integrated chip, microprocessor, or circuit board. The ECU controls operation of the LPG valve.

When it is desired to change the mode of operation of the vehicle from a gasoline mode to the LPG mode in a dual fuel system with EFI, the gasoline valve is closed to stop the flow of gasoline to the gasoline EFI. In order to minimize commingling of the gasoline and LPG and help prevent malfunction of the engine, it is preferred to wait until the gasoline substantially empties from the gasoline rail of the gasoline EFI before opening the LPG valve to receive and access the liquified petroleum gas (LPG). When the LPG valve is opened, the LPG is vaporized by the vaporizer and the gaseous LPG is injected into the dual fuel engine by the gaseous LPG electronic fuel injectors so that the engine can operate on vaporized LPG in the LPG mode. Preferably, in the LPG mode, the LPG valve is opened when the filter $O_2$ signal decreases to a threshold value.

A timer 160 (FIG. 4), sometimes referred to as a watchdog timer, can comprise a timing circuit, and is connected to the ECU. The timer and ECU cooperate to generate a timing signal if the filtered $O_2$ signal does not decrease to a threshold value for a finite predetermined (preselected) period of time. The timer provides a safety backup to help assure better performance of the engine and vehicle. In the LPG mode, the LPG valve will open in response to receiving a timing signal if the LPG valve has not been previously opened when the filtered $O_2$ signal decreases to a threshold value.

In order to change the operation of the dual fuel engine with EFI from the LPG mode to the gasoline mode, the gasoline valve is opened so that the gasoline fuel pump can further pump gasoline to the gasoline EFI. In order to avoid mixing the LPG and gasoline and help maximize performance of the engine, it is preferred to wait until the gasoline substantially fills the gasoline rail of the EFI before closing the LPG valve and stopping the flow, vaporization and feeding of LPG to the engine. After the LPG valve has been closed, gasoline is fed from the gasoline EFI to the engine so that the engine can operate on gasoline in the gasoline mode. Preferably, in the gasoline mode, the LPG valve is closed when the filtered $O_2$ signal increases to a threshold value. Furthermore, desirably in the gasoline mode, the LPG valve will be closed upon receiving a timing signal from the timer if the filtered $O_2$ signal does not increase to a threshold value for a finite predetermined (preselected) period of time if the LPG valve has not previously opened when the filtered $O_2$ signal increases to a threshold value.

The charts (diagrams) which illustrate the timing and flow of gasoline and LPG, as well as the unfiltered $O_2$ signal and the filtered $O_2$ signal as a function of time during the transition from the gasoline mode to the LPG mode and vice versa for a dual fuel method and system with electronic fuel injectors (EFI) are similar to the charts (diagrams) in FIG. 2 and FIG. 3.

Figure 5:
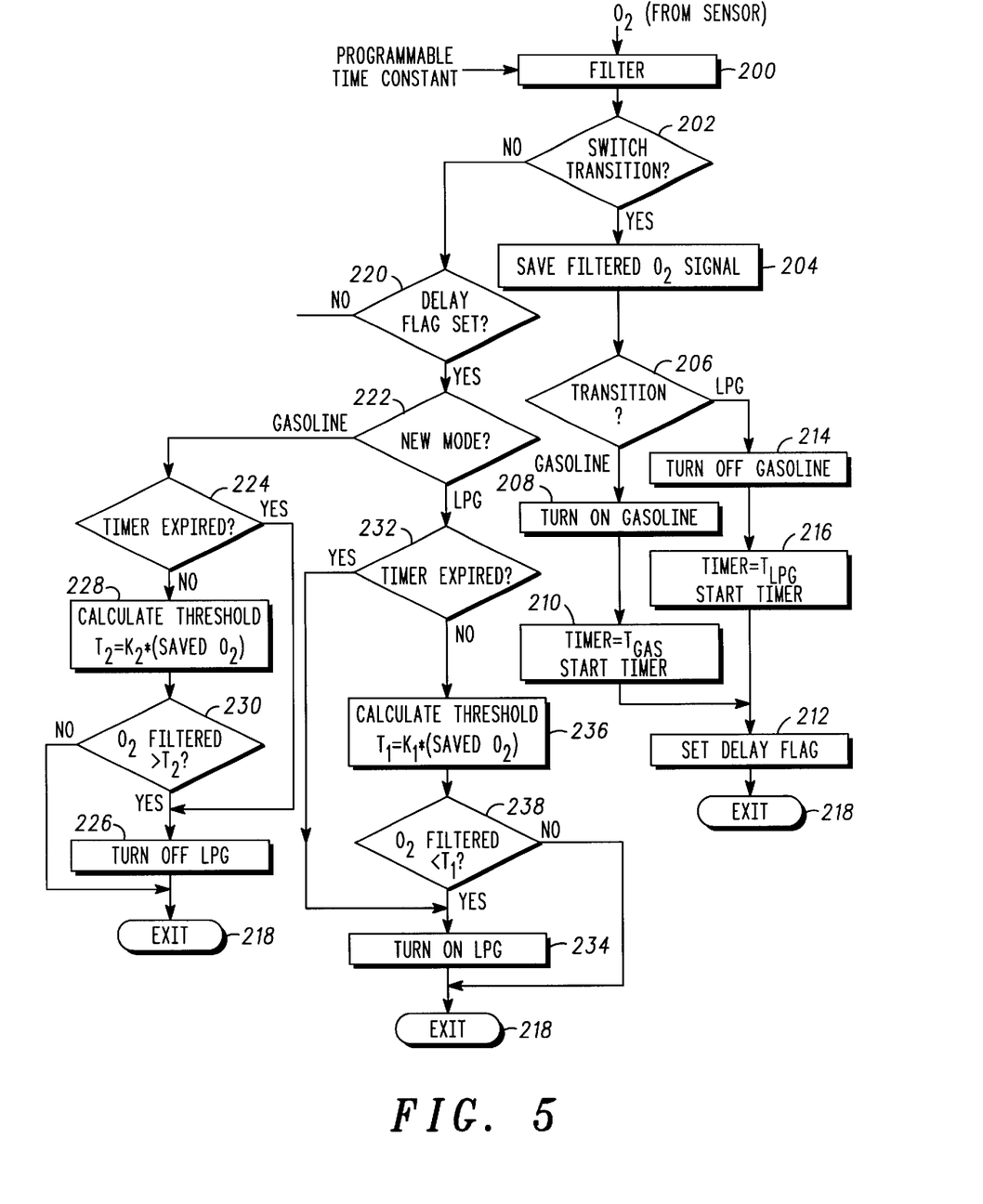
FIG. 5 is a software flow chart of the dual fuel switchover method in accordance with principles of the present invention.

FIG. 5 illustrates a software flow chart (diagram) for the dual fuel switchover method. The filtered $O_2$ signal which is detected from the oxygen ($O_2$) sensor is filtered in a filtering step 200 in order to produce a filtered $O_2$ signal. During the filtering step, a mean or average value of the $O_2$ signal is determined for a finite preselected (predetermined) period of time in response to a programmable time constant. The $O_2$ filtered signal is passed through a switch transition step 202. If a transition to gasoline or LPG is to be made, the filtered $O_2$ signal is saved to step 204 and transmitted to a mode selection and transition step 206. If it is desired to operate the engine on gasoline in the gasoline mode, the gasoline shutoff valve is turned on (opened) at step 208 and a backup timer (watchdog timer) is started at a timing step 210 for a period of time $T_{gas}$. The $T_{gas}$ timing signal can be sent to a set delay flag step 212.

If it is desired to operate the engine on LPG in the LPG mode, the gasoline shutoff valve is turned off (closed) at turnoff gasoline step 214 (FIG. 5) and the filtered 02 signal can be transmitted to a timer (watchdog timer) at a timing step 216. The timer is started for preselected period of time $T_{LPG}$. The $T_{LPG}$ signal can be sent to the set delay flag step 212 where a delay (timing) signal is set. The delay (timing) signal for the $T_{LPG}$ delay time or $T_{gas}$ time is then sent to the exit step 218.

If in step 202 (FIG. 5) no transition to gasoline or LPG is to be made, the filtered $O_2$ signal can be sent to a delay flag set step 220. Subsequently, at the new mode step 222, a determination can be made if the dual fuel engine is to be operated in a different mode, i.e. from gasoline to LPG, or from LPG to gasoline. If the engine is to be switched to the gasoline mode, the filtered $O_2$ signal can be sent to a time expired step 224. If the time has expired at the time expired step 224, then the LPG valve is turned off (closed) at the turnoff LPG step 226. If the time has not expired at the time expired step 224, then a threshold value is calculated at the threshold calculation step 228. The threshold value $T_2$ is greater than 1 and is equal to $K_2$ multiplied by the saved filtered $O_2$ signal. $K_2$ can be a preselected (predetermined) time or constant. The threshold value signal can then be sent to an $O_2$ filtered step 230. If the $O_2$ filtered signal is greater than the calculated threshold value $T_2$, then the LPG valve is closed at the turnoff LPG step 226. If the filtered $O_2$ signal is less than the calculated threshold value $T_2$, then the filtered $O_2$ signal can be transmitted to the exit step 218.

If at new mode selection step 222 (FIG. 5), it is desired to operate the engine with LPG in the LPG mode, the filtered $O_2$ signal can be sent to a timer expired step 232. At the timer expired step 232, a determination is made if the amount of time and timing signal from the timer (watchdog timer) has expired. If the amount of time has expired, the LPG valve is turned on (opened) at the turn on LPG step 234. If the time has not expired, then a threshold value $T_1$, can be calculated at a calculate threshold value step 236. The threshold value $T_1$, can be less than 1 and equal to $K_1$, multiplied by the saved filtered $O_2$ signal. $K_1$, can be a predetermined (preselected) period of time or constant. The calculated threshold value $T_1$, can be sent to an $O_2$ filtered step 238 and compared with an $O_2$ filtered signal. If the $O_2$ filtered signal is less than the calculated threshold value $T_1$, then the LPG valve is opened at the turn on LPG step 234. If the filtered $O_2$ signal is greater than the calculated threshold value $T_1$, then the signal can be transmitted to the exit step 218.

Figure 6:
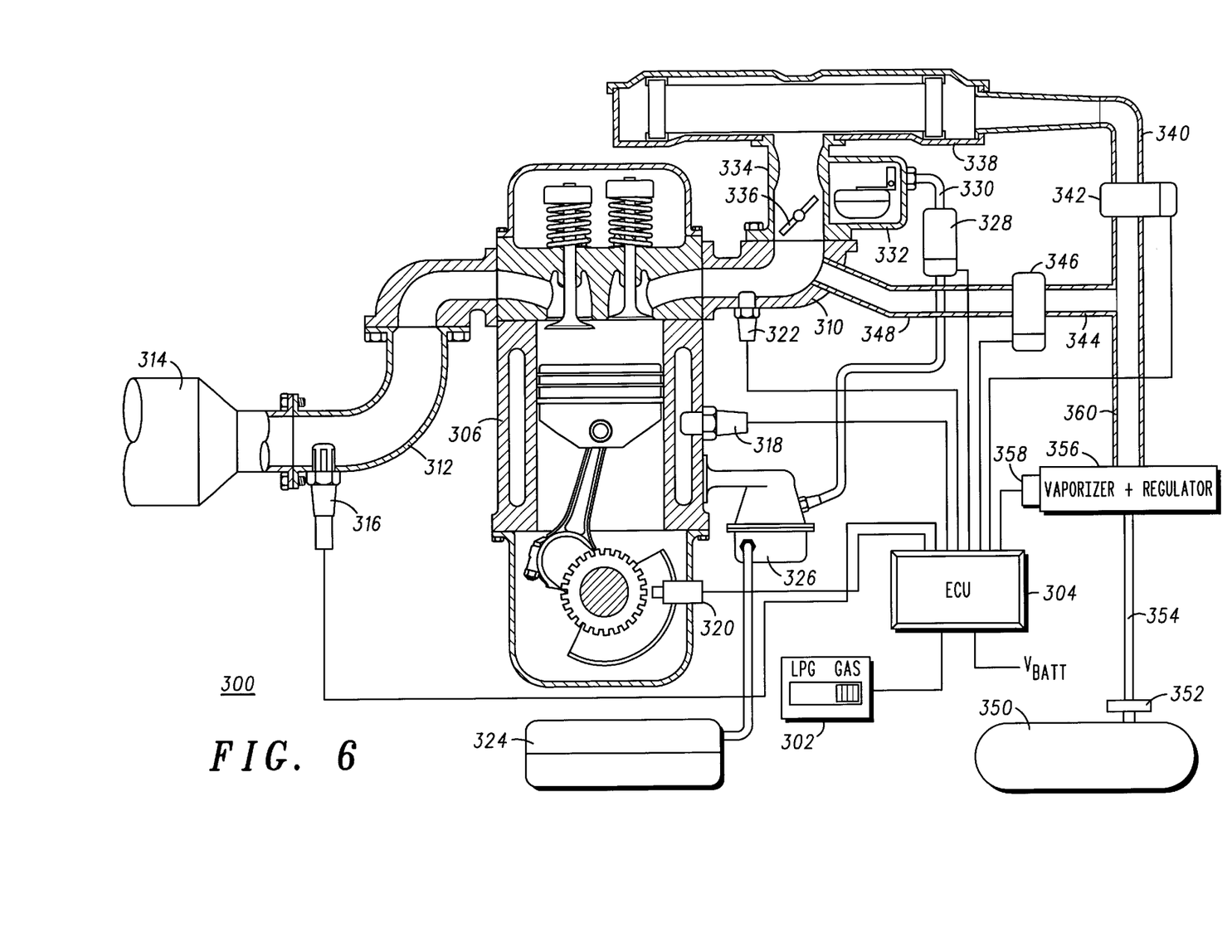
FIG. 6 is a diagram of another carbureted dual fuel system and method in accordance with principles of the present invention.

The carbureted dual fuel method and system 300 has many of the same parts, components, and equipment as the carbureted dual fuel method and system of FIG. 1, as well as additional parts and equipment as explained below. A mode select (selection) switch 302 can be connected to an engine control unit (ECU) 304. The mode select switch can be toggled or switched to a gasoline mode or a liquified petroleum gas (LPG) mode for operating the dual fuel engine 306. The ECU can be connected to the engine and to a battery, the battery having a voltage $V_{BATT}$. The engine can be positioned between and communicates with an intake manifold 310 and an exhaust pipe (discharge pipe) 312. Fuel, e.g. gasoline or LPG, is fed through the intake manifold into the dual fuel engine. Exhaust gases emitted from the engine can be passed through the exhaust pipe (discharge pipe) to a catalytic converter 314. The catalytic converter converts the pollutants in the exhaust gases to unharmful and environmentally acceptable gases in order to purify the exhaust gases in compliance with environmental regulations. The purified exhaust gases can then discharged to the atmosphere. An oxygen ($O_2$) sensor 316 can be positioned in the exhaust pipe between the engine and the catalytic converter in order to detect and monitor the oxygen content of the exhaust gases entering the catalytic converter. The $O_2$ sensor can be connected to and transmits an $O_2$ signal to the ECU. The $O_2$ signal is generally very reliable for determining the oxygen content of the exhaust gases, except during engine startup and during periods of transition such as acceleration, braking, air conditioning startup, etc.

An engine coolant temperature (ECT) sensor 318 can be positioned in or in proximity to the engine to detect and monitor the temperature of the engine coolant (e.g. antifreeze). The ECT sensor can be connected to the ECU. An engine speed sensor 320 can be positioned in or in proximity to the engine to monitor and detect the speed (rpm) of the engine. The engine speed sensor can be connected to the ECU. A manifold absolute pressure (MAP) sensor 322 can be positioned in the intake manifold to detect and monitor the absolute pressure of the fuel passing through the intake manifold to the engine. The MAP sensor can be connected to ECU. The MAP sensor in cooperation with the ECT sensor and the engine speed sensor, are helpful to monitor performance of the engine and vehicle during engine startup and periods of transition, such as braking, acceleration, air condition startup, etc., when the $O_2$ signal may not be reliable. A MAP sensor, ECT sensor, and/or engine speed sensor can also be used in the carbureted dual fuel method and system of FIG. 1.

The carbureted dual fuel method and system of FIG. 6 also has a gasoline tank 324 and a gasoline fuel pump 326. The gasoline fuel pump can be mounted on or positioned in proximity to the engine. The gasoline fuel pump feeds and pumps gasoline from the gasoline tank to a gasoline shutoff valve 328. The gasoline shutoff valve can be connected to and communicates with the engine control unit (ECU). When the gasoline shutoff valve is opened, gasoline can flow and be passed, such as at a pressure of 1 bar or atmospheric pressure, through a gasoline line (hose) 330 to a float bowl 332 of a carburetor 334. When the gasoline shutoff valve is closed, gasoline is prevented from passing and flowing to the carburetor. The carburetor can have a manually operable valve, such as a butterfly valve 336, which regulates the air-fuel ratio, such as for summer or winter driving. Gasoline flowing through the carburetor passes through the intake manifold and is fed to the dual fuel engine. An air filter 338 can be positioned on or in proximity to the carburetor. Ambient air drawn into the engine is passed through the air filter to remove and filter unwanted particulates. The filtered air can pass and flow through an air hose (air line) 340 to a one-way valve 342. The one-way valve permits air to flow from air hose 340 through to hose 344 and air valve (control valve) 346. The one-way air valve prevents the flow of LPG, as well as the back flow of air, from hose 344 to air hose 340 and the air filter. The air valve (control valve) preferably comprises a pulse width modulation (PWM) valve which controls the flow of air when the engine is operating in the gasoline (carburetor) mode and controls the flow of vaporized LPG when in the engine is operating in the LPG mode. The air valve (PWM) can be connected to and communicates with the ECU. When the air valve is opened, air flowing through the air valve is passed through hose (line) 348 to the intake manifold where it is mixed with the gasoline at the selected air-fuel ratio before the gasoline is fed into the engine.

The caburated dual fuel method and system of FIG. 6 also has a gaseous fuel tank 350, such as an LPG tank containing propane of other LPG. The LPG tank can have an LPG tank shutoff valve 352. When the LPG tank shutoff valve is opened, LPG gas can flow at a pressure of 10–25 bar through an LPG line 354 to a vaporizer and regulator 356. An LPG shutoff valve 358 can be connected to the vaporizer and regulator. The LPG valve can also be connected to the engine control unit (ECU). When the LPG valve is opened, the vaporizer and regulator will vaporize the LPG and permit the flow of vaporized LPG through a vaporized LPG line (hose) 360 and hose 344 to the air valve (PWM valve) 346. When the LPG is closed, the regulator prevents LPG gas from passing through the vaporized LPG gas line. In the LPG mode, the pulse width modulation (PWM) valve 346 permits the vaporized LPG to pass through hose 348 into the intake manifold where it is fed into the dual fuel engine.

Instead of using LPG, the gaseous fuel tank of FIG. 6 can contain compressed natural gas (CNG) comprising methane or other light hydrocarbon gases.

The ECU can monitor the input signals and controls the shutoff valves and PWM valve based upon the input signals. Advantageously, the air valve (PWM valve) controls the air-fuel mixture in the gasoline mode and the flow of LPG in the LPG mode.

When the dual fuel engine is in the gasoline mode, the PWM valve controls the air flow through the one-way valve to dilute the mixture provided by the carburetor. Preferably the carburetor is run (operated) rich. In the gasoline mode, the gasoline shutoff valve is opened and the LPG shutoff valve is closed.

In the LPG mode, the LPG shutoff valve is opened and the gasoline valve is closed as explained previously. The pressure in the hose 344 is higher than the atmospheric pressure so that the one-way valve is closed and prevents flow of LPG into the air filter. The PWM valve regulates the flow of vaporized LPG into the intake manifold that is fed into the dual fuel engine during the LPG mode.

Charts (diagrams) illustrating the flow of gasoline and LPG, as well as the unfiltered $O_2$ signal and the filtered $O_2$ signal as a function of time, during the transition from a gasoline mode to an LPG mode and vice versa, for the dual fuel method and system of FIG. 6 would be substantially similar to the charts (diagrams) of FIGS. 2 and 3.

In order to enhance engine performance, the air-fuel ratio of carbureted internal combustion engines are monitored and controlled. Monitoring of the air-fuel ratio is desirable to enhance fuel economy and engine performance as well as better comply with vehicle emission regulations. Generally, the oxygen ($O_2$) sensor maintains its accuracy only at or near stoichiometric combustion conditions. The ECU can determine the proportional integrated differential (PID) gain scheduling parameters to obtain a target air-fuel ratio. The ECU can comprise a microprocessor having access to a computer memory and random access memory to store and process variables during performance of the vehicle. The ECU can receive the $O_2$ signal from the $O_2$ sensor generally when the engine is operating at stoichiometric combustion conditions. Preferably, the ECU controls the fuel supplied to the engine at the target air-fuel ratio to maximize fuel economy and minimize emission of pollutants.

Carbureted engines operate by combusting an air-fuel mixture of gasoline with a spark from spark plugs. The air-fuel ratio can be calculated and controlled in a closed loop system with an oxygen ($O_2$) sensor as described. $O_2$ sensors can be constructed of zirconium oxide material. Zirconium oxide $O_2$ sensors can provide an output signal that fluctuates between 0 and 1 volt depending upon the concentration of oxygen detected by the $O_2$ sensor. $O_2$ sensors are temperature dependent and are often not reliable, as previously explained, during engine startup and during transition periods, such as during acceleration, braking, or air conditioning startup, etc. The $O_2$ sensor also provides a feedback control to regulate the air-fuel ratio from the oxygen concentration in the exhaust gases. The air-fuel ratio can be determined as to whether it is lean or rich in comparison with a stoichiometric air-fuel ratio. A lean carbureted mixture is satisfactory when the engine temperature is stabilized and the average engine speed is normal. A rich carbureted mixture is preferred during engine startup as well as during acceleration and high engine loads.

Electronic carburetion controllers are regulated by the ECU and operate on a closed loop principle when the engine temperature is stabilized with an average load. The carbureted engine is switched to an open loop operation during periods of transition, such as acceleration, braking, high engine loads, etc. Once the engine is stabilized and operating in a normal mode, the $O_2$ sensor transmits the filtered $O_2$ signal to the ECU which regulates the air-fuel ratio.

The catalytic converter can contain a three-way catalyst which simultaneously converts hydrocarbons, carbon monoxide (CO), and oxides of nitrogen ($NO_x$), such as nitric oxide and nitrous oxide, to harmless environmentally acceptable gaseous emissions. To assure that the catalyst performs satisfactory, the engine should have a closely controlled air-fuel ratio. The air-fuel ratio can be controlled and monitored by detecting the oxygen ($O_2$) content of the exhaust gases with the $O_2$ sensor positioned in the tailpipe (discharge pipe) or exhaust manifold. If the air-fuel ratio is operating rich, the oxidation of carbon monoxide (CO) will be incomplete. If the air-fuel ratio to too lean, the reduction of $NO_x$ will be incomplete. Therefore, it is important to accurately and continuously monitor the oxygen content of the exhaust gases with the $O_2$ sensor as described previously.

During the closed loop mode of engine operation, the oxygen content from the $O_2$ sensor is accepted by the ECU. The ECU will control the air-fuel mixture for engine operating conditions and will correct any pre-existing mixture condition if too lean or too rich. The engine is operated in a closed loop mode of operation during normal stabilized driving conditions, such as in cruise control.

During the open loop mode of engine operation, the air-fuel mixture is maintained at a programmed ratio and response to the signals from the MAP sensor, ECT sensor and engine speed sensor. The oxygen sensor data is not accepted by the ECU during the open loop mode of operation. The open loop mode of operation occurs during: engine startup, acceleration, braking, high engine loads, startup of air conditioner, low coolant temperatures, low exhaust gas temperatures, engine idling, wide open throttle (WOT) engine operation, low battery voltages, etc.

Among the many advantages of the dual fuel methods and systems of the invention are:

1. Outstanding fuel economy.
2. Superb engine performance.
3. Eliminates costly control elements for LPG operation.
4. Avoids duplicates parts and equipment.
5. More compact then conventional dual fuel systems.
6. Smooth excellent transitions from the gasoline mode to the LPG mode and vice versa.
7. Simple to operate.
8. User-friendly.
9. Dependable.
10. Easy-to-use.
11. Convenient.
12. Attractive.
13. Economical.
14. Uses less engine parts.
15. Better fuel consumption.
16. Safe.
17. Efficient.
18. Effective.

Although embodiments of the invention have been shown and described, it is to be understood that various modifications, substitutions and rearrangements of parts, components, equipment and method (process) steps, can be made by those skilled in the art without departing from the novel spirit and scope of this invention.

What is claimed is:

1. A method for operating a dual fuel system, comprising the steps of:
    pumping a first fuel to a first fuel feeding device;
    feeding the first fuel from the first fuel feeding device to an engine;
    operating the engine with the first fuel in a first fuel mode;
    changing the mode of operation of the engine to operate on a second fuel by
        stopping the flow of the first fuel to the first fuel feeding device;
        preventing the flow of the first fuel from the first fuel feeding device to the engine; thereafter
        opening a valve for feeding the second fuel to a second fuel feeding device;
        passing the second fuel to the engine; and
        operating the engine on the second fuel in a second fuel mode;
    monitoring the oxygen content of exhaust gases emitted from the engine;
    generating a filtered signal based upon the monitored oxygen content of the exhaust gases over a finite period of time, the generating of the filtered signal occurring in association with an engine control unit (ECU); and
    controlling operation of the valve via the ECU based upon the signal.

2. A method for operating a dual fuel system in accordance with claim 1 including changing the mode operation of the engine from the second fuel mode to the first fuel mode by:
    starting the flow of the first fuel to the first fuel feeding device;
    closing the valve to stop the flow and feeding of the second fuel to the engine;
    feeding the first fuel from the first fuel feeding device to the engine; and
    operating the engine on the first fuel.

3. A method for operating a dual fuel system in accordance with claim 1 wherein:
    the first fuel feeding device comprises a carburetor with a float bowl; and
    the first fuel is pumped by a fuel pump operatively associated with the engine.

4. A method for operating a dual fuel system in accordance with claim 1 wherein:
    the first fuel feeding device comprises one or more electronic fuel injectors (EFI) with a rail and fuel line; and the first fuel is pumped by a fuel pump operatively associated with a first fuel tank.

5. A method for operating a dual fuel system in accordance with claim 1 including opening the valve when the signal decreases upon changing to the second fuel mode.

6. A method for operating a dual fuel system in accordance with claim 1 including closing the valve when the signal increases upon changing to the first the mode.

7. A method for operating a dual fuel system in accordance with claim 1 including:
   timing said signal; and
   opening the valve in the second fuel mode if the signal does not substantially change for a predetermined period of time.

8. A method for operating a dual fuel system in accordance with claim 1 including:
   timing said signal; and
   closing the valve in the first fuel mode if the signal does not substantially change for a predetermined period of time.

9. A method for operating a dual fuel system in accordance with claim 1 wherein:
   said first fuel and said second fuel are selected from the group consisting of a liquid fuel, gasoline, petro, a gaseous fuel, liquefied petroleum gas (LPG), and compressed natural gas (CNG); and
   said first fuel is different than said second fuel.

10. A method for operating a dual fuel system, comprising the steps of:
    pumping gasoline to a carburetor with a fuel pump;
    feeding gasoline from the carburetor to an engine;
    operating the engine on gasoline in a gasoline mode;
    detecting and monitoring the oxygen content of exhaust gases emitted from the engine;
    generating a signal based upon the detected oxygen content of the exhaust gases;
    determining a mean or average value of the signal for a preselected period of time;
    filtering the signal to produce a filtered signal corresponding to the means or average value of the signal, the filtering occurring in association with an engine control unit (ECU);
    controlling operation of an LPG valve with the ECU;
    changing the mode of operation of the engine from gasoline to liquified petroleum gas (LPG);
    establishing a reference filtered signal when the mode of operation of the engine is changed from gasoline to LPG;
    closing a gasoline valve to stop the flow of gasoline to the carburetor;
    waiting until the gasoline substantially empties from a float bowl of the carburetor; thereafter
    opening the LPG valve to access the liquified petroleum gas (LPG);
    vaporizing the liquified petroleum gas (LPG);
    feeding the vaporized LPG to the engine; and
    operating the engine on vaporized LPG in the LPG mode.

11. A method for operating a dual fuel system in accordance with claim 10 including opening the LPG valve in the LPG mode when the filtered signal decreases to a threshold value below the reference filtered signal.

12. A method for operating a dual fuel system in accordance with claim 10 including:
    operating a timer in cooperation with the ECU to generate a timing signal if the filtered signal does not decrease to a threshold value below the reference filtered signal for a predetermined period of time; and
    opening the LPG valve in the LPG mode in response to the timing signal.

13. A method for operating a dual fuel system in accordance with claim 10 including changing the operation of the engine from the LPG mode to the gasoline mode by:
    opening the gasoline valve;
    further pumping gasoline to the carburetor;
    waiting until the gasoline substantially fills the float bowl of the carburetor; thereafter
    closing the LPG valve and stopping the flow, vaporization and feeding of LPG to the engine;
    feeding gasoline from the carburetor to the engine; and
    operating the engine on gasoline.

14. A method for operating a dual fuel system in accordance with claim 13 including closing the LPG valve in the gasoline mode when the filtered signal increases to a threshold value above the reference filtered signal.

15. A method for operating a dual fuel system in accordance with claim 13 including:
    operating a timer in cooperation with the ECU to generate a timing signal if the filtered signal does not increase to a threshold value above the reference filtered signal for a predetermined period of time; and
    closing the LPG valve in the gasoline mode in response to the timing signal.

16. A method for operating a dual fuel system, comprising the steps of:
    pumping a first fuel to a first electronic fuel injector (EFI) system comprising one or more electronic fuel injectors (EFI) with a fuel feeding device comprising a fuel line and a rail, and a fuel pump operatively associated with a gasoline tank;
    injecting the first fuel from the first EFI system to the engine;
    operating the engine with the first fuel in a first fuel mode;
    sensing and monitoring the oxygen content of exhaust gases emitted from the engine;
    generating a signal based upon the sensed oxygen content of the exhaust gases;
    determining a mean or average value of the signal for a preselected period of time;
    filtering the signal to produce a filtered signal corresponding to the mean or average value of the signal, the filtering occurring in association with an engine control unit (ECU);
    controlling operation of a second fuel valve with the ECU;
    changing the mode of operation of the engine from the first fuel to the second fuel;
    establishing a reference filtered signal when the mode of operation of the engine is changed from the first fuel to the second fuel;
    stopping the flow of the first fuel from the gasoline tank;
    opening the second fuel valve to access the second fuel to a second EFI system;
    injecting the second fuel from the second EFI system to the engine; and
    operating the engine with the second fuel in the second fuel mode.

17. A method for operating a dual fuel system in accordance with claim 16 including opening the second fuel valve in the second fuel mode when the filtered signal decreases to a threshold value below the reference filtered signal.

18. A method for operating a dual fuel system in accordance with claim 16 including:
    operating a timer in cooperation with the ECU to generate a timing signal if the filtered signal does not decrease to a threshold value below the filtered signal for a predetermined period of time; and
    opening the second fuel valve in the second fuel mode in response to the timing signal.

19. A method for operating a dual fuel system in a vehicle in accordance with claim 16 including changing the operation of the engine from the second fuel mode to the first fuel mode by:
    starting the flow of the first fuel from the gasoline tank;
    further pumping the first fuel to the first EFI system;
    closing the second fuel valve and stopping the flow and feeding of the second fuel to the engine;
    feeding the first fuel from the first EFI system to the engine; and
    operating the engine with the first fuel.

20. A method for operating a dual fuel system in accordance with claim 19 including closing the second fuel valve in the first fuel mode when the filtered signal increases to a threshold value above the reference filtered signal.

21. A method for operating a dual fuel system in accordance with claim 19 including:
    operating a timer in cooperation with the ECU to generate a timing signal if the filtered signal fails to increase to a threshold value above the reference filtered signal for a predetermined period of time; and
    closing the second fuel valve in the first fuel mode in response to the timing signal.

22. A method for operating a dual fuel system in accordance with claim 16 wherein:
    the first fuel and the second fuel are selected from the group consisting of a liquid fuel, gasoline, petro, a gaseous fuel, liquefied petroleum gas, and compressed natural gas (CNG); and
    the first fuel is different than the second fuel.

23. A dual fuel system, comprising:
    a dual fuel engine powered by two different fuels including a first fuel comprising gasoline and a second fuel, and said engine being operable in a gasoline mode and in a second fuel mode;
    an intake manifold connected to said engine for passing fuel to said engine;
    a carburetor having a float bowl and a valve communicating with said intake manifold for feeding gasoline to said engine when said engine is operating in the gasoline mode;
    a gasoline tank for storing and containing gasoline;
    a fuel pump for pumping gasoline from said gasoline tank to said carburetor when said engine is operating in the gasoline mode;
    a gasoline valve for controlling the flow of gasoline to said carburetor;
    a control valve communicating with said air filter and said intake manifold for passing filtered air from said filter to said gasoline flowing into said intake manifold at an air fuel ratio regulated by said valve of said carburetor;
    a one-way valve for permitting flow and passage of filtered air from said air filter to said air valve but preventing the flow of the second fuel to said air filter;
    a second fuel tank for storing and containing the second fuel;
    a second fuel valve for controlling the flow of the second fuel from the second fuel tank to said control valve;
    said control valve being operable to permit flow and passing of the second fuel to said intake manifold when said engine is operating in the second fuel mode;
    an engine control unit (ECU) operatively associated with said engine, control valve, and second fuel valve for controlling the performance of said engine, control valve, and second fuel valve; and
    a mode selection switch connected to said ECU to select when the engine is operated in the gasoline mode or the second fuel mode.

24. A dual fuel system in accordance with claim 23 wherein:
    said second fuel comprises liquified petroleum gas (LPG);
    said second fuel valve comprises an LPG valve; and
    a regulator and vaporizer are connected to said LPG valve for regulating and vaporizing the LPG when said engine is operating in the second fuel mode.

25. A dual fuel system in accordance with claim 23 wherein:
    the second fuel comprises compressed natural gas (CNG); and
    said second fuel tank comprises a CNG tank.

26. A dual fuel system in accordance with claim 23 including:
    an exhaust pipe communicating with said engine for discharging the exhaust gases;
    a catalytic converter for minimizing emission of pollutants from the exhaust gases into the atmosphere; and
    an $O_2$ sensor communicating with said ECU for sensing the oxygen content in the exhaust gases.

27. A dual fuel system in accordance with claim 23 wherein said control valve comprises a dual air valve and a pulse width modulation valve.

* * * * *